United States Patent
Bearden, III et al.

(10) Patent No.: US 6,347,301 B1
(45) Date of Patent: Feb. 12, 2002

(54) CONFERENCE COMMUNICATION FACILITATOR AND METHOD OF USE

(76) Inventors: Fred E. Bearden, III, 24991 Stonegate La., Laguna Niguel, CA (US) 92677; John D. McNicol, 9 Via Nandina, Rancho Santa Margarita, CA (US) 92688

( * ) Notice: Subject to any disclaimer, the term of this patent is extended or adjusted under 35 U.S.C. 154(b) by 0 days.

(21) Appl. No.: 09/241,937

(22) Filed: Feb. 2, 1999

(51) Int. Cl.[7] ............................................. G06F 17/60

(52) U.S. Cl. .............................................. 705/1; 705/5

(58) Field of Search ........................... 705/1, 5, 26, 30, 705/32, 28, 14; 235/375, 462.45, 376, 475, 450, 472, 385; 710/102

(56) References Cited

U.S. PATENT DOCUMENTS

| | | | |
|---|---|---|---|
| 4,387,296 A | 6/1983 | Newell | 235/376 |
| 4,509,277 A | 4/1985 | Bolton | 40/1.5 |
| 4,628,193 A | 12/1986 | Blum | 235/375 |
| 4,654,793 A | 3/1987 | Elrod | 364/401 |
| 5,331,136 A | 7/1994 | Koenck | 235/375 |
| 5,380,994 A | 1/1995 | Ray | 235/472 |
| 5,455,409 A | 10/1995 | Smith | 235/385 |
| 5,483,472 A | 1/1996 | Overman | 364/705.06 |
| 5,721,942 A | 2/1998 | Nishiyama | 395/800 |
| 5,740,549 A * | 4/1998 | Reilly et al. | 705/14 |
| 5,821,512 A | 10/1998 | O'Hagan | 235/383 |
| 5,936,542 A * | 8/1999 | Kleinrock et al. | 340/825.34 |
| 5,943,653 A * | 8/1999 | Ross et al. | 705/14 |

FOREIGN PATENT DOCUMENTS

GB         710938    *   7/1995

OTHER PUBLICATIONS

Murirhead Greg, Hand–held device could help phamacists make home visits, pp 1–2, May 1994.*

Dean Takahashi, Prof.'s Idea for Speedy Chip could be More Than Academic, Wall Street Journal, pp 1–3, 08/98.*

Sun Microsystems: Java platform for consumer devices ships, pp 1–2; 01/98.*

April Carolyn A, NEC and intoduce hand–held devices, pp 1–2; Nov. 1996.*

April Carolyn A, Microsoft's Pegasus plans take wing, pp 1–2, May 1994.*

* cited by examiner

Primary Examiner—Eric W. Stamber
Assistant Examiner—Mussie Tesfamariam
(74) Attorney, Agent, or Firm—Lyon & Lyon LLP (57) ABSTRACT

A conference communication facilitator includes a hand-held computer used in conjunction with an alphanumeric identifier uniquely associated with a conference attendee. The hand-held computer is shaped to fit within a user's hand and bears an advertising indicia. The hand-held computer contains a microprocessor, a memory chip for storing data, an electrical contact connector for inputting data into the memory chip, an LCD display for displaying the data, a keypad for manipulating the data. The hand-held computer is preferably used in conjunction with a plurality of alpha-numeric identifiers, each alphanumeric identifier being unique to each aspect of the data. In its preferred embodiment, the hand-held computer is used as a conference facilitator assembly for facilitating interaction with a conference attendee. The conference facilitator assembly is used by a user to retrieve data about a conference attendee with reference to an alphanumeric identifier displayed on an identification badge worn by the conference attendee. The conference facilitator assembly includes an identification badge worn by each of the conference attendees, the identification badge displaying the alphanumeric identifier in oversized and bold print to allows easy identification of the conference attendee.

6 Claims, 4 Drawing Sheets

CONFERENCE COMMUNICATION FACILITATOR AND METHOD OF USE

BACKGROUND OF THE INVENTION

1. Field of the Invention

This invention relates generally to hand-held computers, and more particularly to a hand held computer bearing advertising indicia, the hand-held computer being designed to be distributed at large events such as conferences, conventions, and sporting events. The hand-held computer is preferably used in conjunction with an alphanumeric indicator uniquely associated with a conference attendee or athletic participant.

2. Description of Related Art

Portable computers are well known in the art. Laptop computers have shrunk to the size of small notebooks, and they contain the processing power of much larger desktop models. Palm-top computers are also well known, offering users limited word processing and email retrieval capabilities. While laptop computers perform their jobs well, they are also very expensive. Palm-top computers are also relatively expensive. Palm-top computers also suffer from the drawback that, in attempting to meet the needs of many, they often do not meet the needs of anyone to great satisfaction. For all practical purposes, most palm-top computers are primarily used as personal organizers.

The prior art teaches portable computers used to store and track data. However, the prior art does not teach a portable computer that bears advertising, making the computer uniquely suitable for large scale distribution at conferences, conventions, and large sporting events. The prior art also does not disclose the use of a hand-held computer in conjunction with an alphanumeric indicator uniquely associated with a conference attendee or athletic participant. The present invention fulfills these needs and provides further related advantages as described in the following summary.

SUMMARY OF THE INVENTION

The present invention teaches certain benefits in construction and use which give rise to the objectives described below.

The present invention provides a conference communication facilitator system that includes a communication facilitator assembly and a method of using the facilitator assembly to improve data dissemination at conferences, conventions, sports events, and similar gatherings. The conference communication facilitator includes both a hand-held computer and an alphanumeric indicator uniquely associated with individuals at the event. The hand-held computer has a computer housing shaped to fit within a user's hand. The computer housing contains a microprocessor, a memory means for storing data, an initial data input means for inputting data into the memory means, a display means for displaying the data, a data manipulation means for manipulating the data. The computer housing bears an advertising indicia. The revenues generated from the sale of advertising indicia facilitates mass production and wide distribution of the hand-held computer for a variety of uses. The hand-held computer is preferably used in conjunction with a plurality of alphanumeric identifiers. In its preferred embodiment, the hand-held computer is used as a conference communication facilitator system for facilitating interaction with a conference attendee. The conference communication facilitator system is used by a user to retrieve data about a conference attendee with reference to an alphanumeric identifier displayed on an identification badge worn by the conference attendee. The conference communication facilitator system includes an identification badge worn by each of the conference attendees, the identification badge displaying the alphanumeric identifier in oversized and bold print to allows easy identification of the conference attendee. The conference communication facilitator system further includes a hand-held computer containing data about all of the conference attendees. The alphanumeric identifier is included in the data stored in the hand-held computer, thereby allowing the user to quickly reference relevant data.

A primary objective of the present invention is to provide a conference communication facilitator system having advantages not taught by the prior art.

Another objective is to provide a hand-held computer used in conjunction with an identification badge bearing an alphanumeric identifier, the combination providing data that is easy to reference to a specific conference attendee.

A further objective is to provide a method for distributing data using a hand-held computer bearing advertising indicia.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
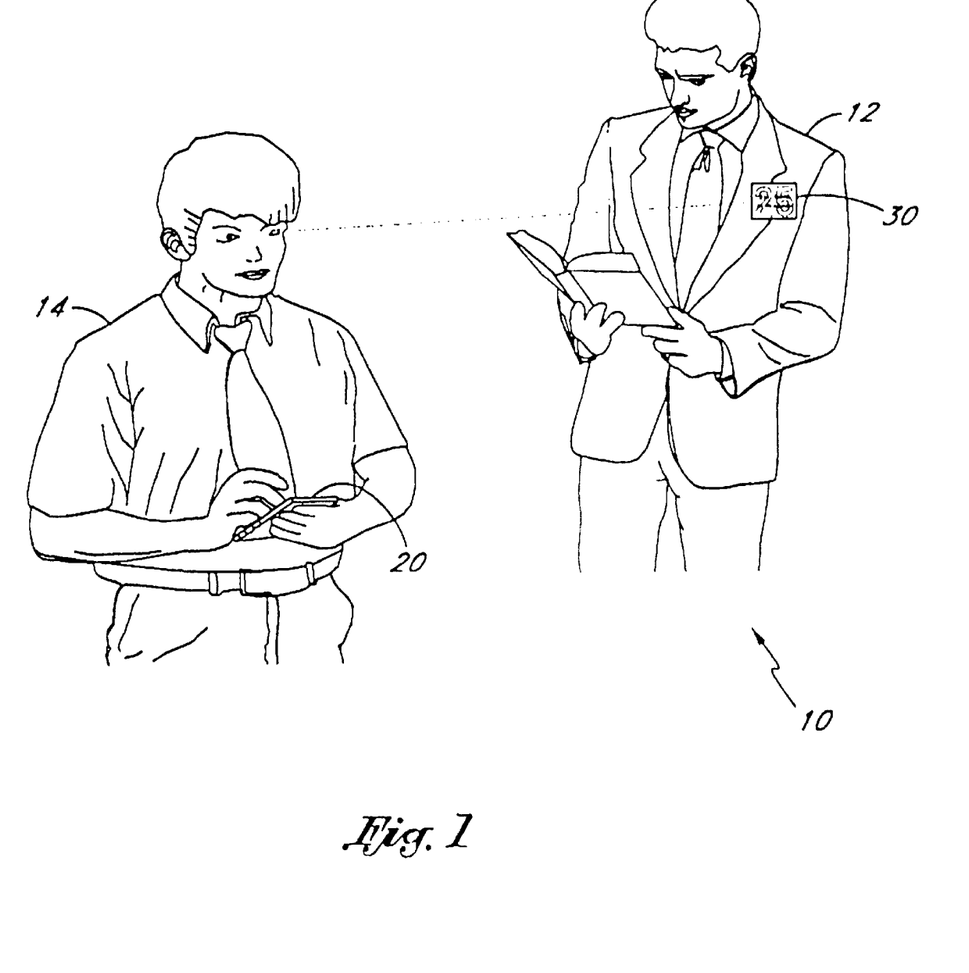
FIG. 1 is a perspective view of the preferred embodiment of the present invention being used by a user to retrieve information about a conference attendee.

The above described drawing figures illustrate the invention, a conference communication facilitator system that includes a communication facilitator assembly 10 and a method of using the facilitator assembly to improve data dissemination at conferences, conventions, sports events, and similar gatherings. The conference facilitator assembly 10 preferably includes a hand-held computer 20 bearing advertising, the hand-held computer 20 having a plurality of uses. In its preferred mode, the hand-held computer 20 is used as a conference facilitator assembly 10 for facilitating interaction with a conference attendee 12. As shown in FIG. 1, the conference facilitator assembly 10 is used by a user 14 to retrieve data about a conference attendee 12 with reference to an alphanumeric identifier 34 uniquely assigned to that conference attendee 12. In its preferred embodiment, the alphanumeric identifier 34 is displayed on an identification badge 30 worn by the conference attendee 12. The identification badge 30 preferably displays the alphanumeric identifier 34 in oversized and bold print that allows easy identification of the conference attendee 12 at a distance greater than an attendee's name 32 which is printed smaller than the alphanumeric identifier 34. The conference facilitator assembly 10 further includes a hand-held computer 20 containing data about all of the conference attendees 12 entered according to each attendee's uniquely assigned alphanumeric identifier 34. All alphanumeric identifiers 34 are included in the data stored in the hand-held computer 20, thereby allowing the user 14 to quickly reference relevant data by entering the alphanumeric identifier 34 associated with the required data.

Figure 2:
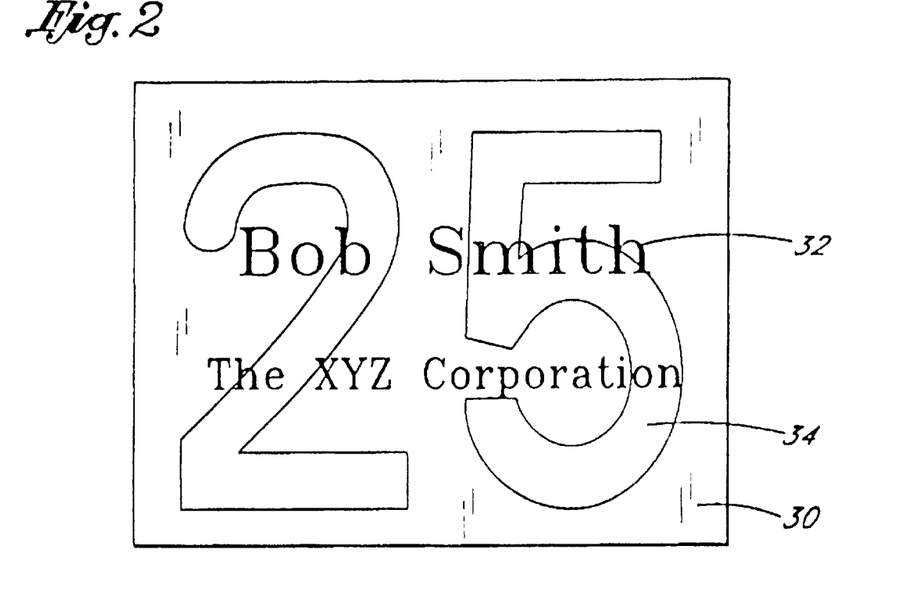
FIG. 2 is a top plan view of an identification badge.

As shown in FIG. 2, the identification badge 30 has an alphanumeric identifier 34 prominently displayed in a large and bold font, thereby allowing users 14 to identify the conference attendee 12 from a distance without undue staring at the identification badge 30 of the conference attendee 12. The alphanumeric identifier 34 is preferably as short and simple as possible to eliminate confusion, preferably between one and five digits. As described below, the alphanumeric identifier 34 is associated with data about the conference attendee 12, thereby facilitating easy reference of the relevant data in the presence of the conference attendee 12. In its preferred embodiment, the identification badge 30 also includes the name of the conference attendee 12 prominently displayed. The identification badge 30 has an attachment means (not shown) for removably attaching the identification badge 30 to the conference attendee 12. The attachment means is preferably a clip capable of removably engaging the clothing of the conference attendee 12. Such clips are well known in the art. In an alternative embodiment, the identification badge 30 has an adhesive backing that removably attaches to the clothing of the conference attendee 12.

Figure 3:
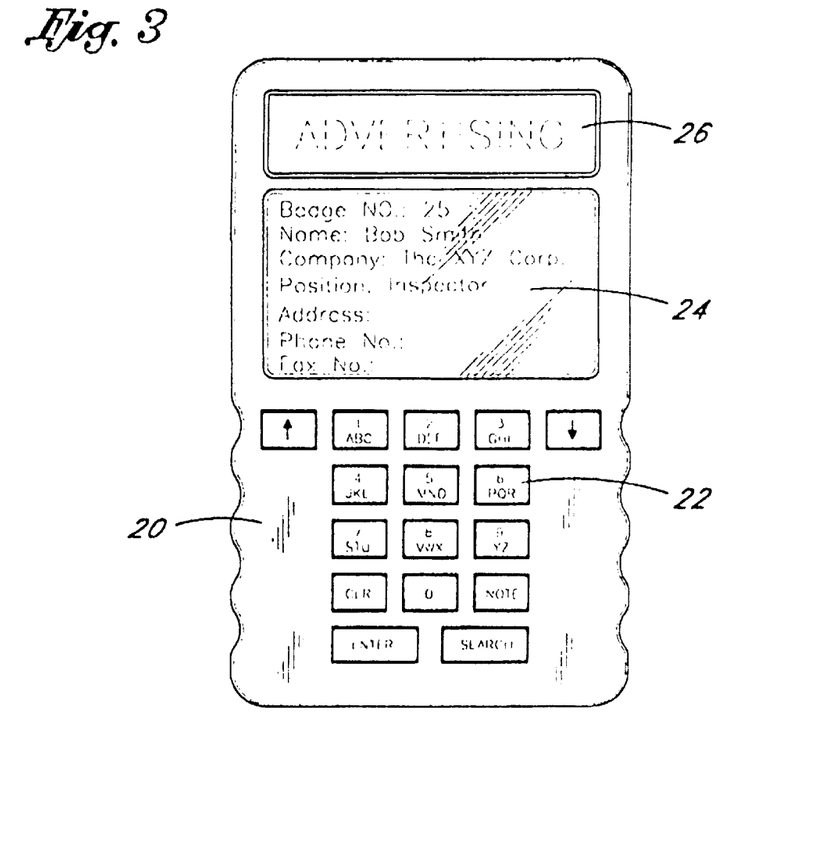
FIG. 3 is a top plan view of a hand-held computer.
Figure 4:
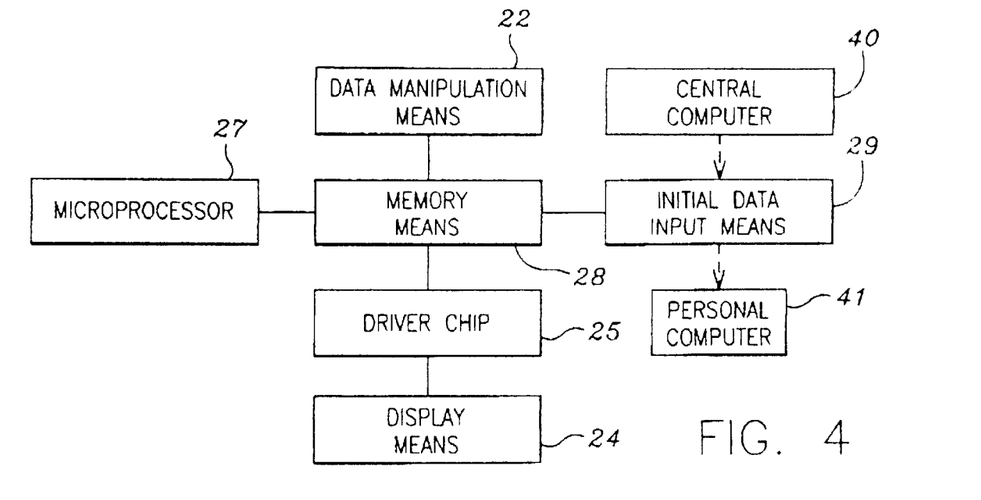
FIG. 4 is a schematic of the preferred embodiment of the hand-held computer.

As shown in FIGS. 3 and 4, the hand-held computer 20 includes a microprocessor 27, a memory means 28 for storing data, an initial data input means 29 for inputting data into the memory means 28, a display means 24 for displaying the data, a data manipulation means 22 for manipulating the data. The memory means 28 preferably includes at least one random access memory chip ("RAM"), at least one electronically erasable programmable ROM chip ("EEPROM"), and at least one read-only memory chip ("ROM"). The EEPROM provides memory for storing data and program elements; the ROM provides fixed programming memory; and the RAM provides working memory. A typical chip arrangement is described in Mandelbaum et al., U.S. Pat. No. 5,544,246, hereby incorporated by reference in full. To reduce manufacturing costs, it is preferred that these functions all be contained on one chip. These features are all well known in the art, and the specific electronic elements and structure of the hand-held computer 20 can be devised by those skilled in the art without altering the inventive nature of this invention. The display means 24 is preferably an LCD screen electronically connected with an LCD driver chip 25 to the memory means 28, although many acceptable alternate display means are well known in the art. The initial data input means 29 is preferably at least one electrical contact connector adapted to receive data from the central computer 40 and transmit the data to the memory means 28. In an alternative embodiment, the initial data input means 29 is a transmitter/receiver that allows data to be downloaded to the hand-held computer 20 via a radio or infrared connection. It is preferred that the user 14 be able to later download the data contents of the hand-held computer 20 to his or her personal computer 41 for separate storage and utilization. In its most complex embodiment, the initial data input means 29 includes interconnecting the central computer 40 to the memory means through a connection that includes a global communications network such as the Internet™, thereby allowing worldwide dissemination of the data, as described below. Various such initial data input means 29 are known in the art and can be selected or devised by those skilled in the art.

The hand-held computer 20 further includes a data manipulation means 22. The data manipulation means 22 is preferably a keypad electronically connected to the memory means 28. The keypad 22 shown in FIG. 3 includes a large number of buttons for more complex functionality; however, in another embodiment the hand-held computer 20 includes only three or four buttons. A hand-held computer 20 having only a few buttons can easily operate specific preprogrammed commands to navigate a series of preprogrammed menus. This not only makes the hand-held computer 20 simpler to use, it also reduces manufacturing costs. In an alternative embodiment, the data manipulation means 22 is a microphone operably connected to a voice recognition program stored in the memory means 28. Such a system allows the user 14 to select the desired alphanumeric identifier 34 by a verbal command and then scroll through the data with additional verbal commands. In its most preferred embodiment, the hand-held computer 20 also allows the user 14 to input notes directly into the data related to the conference attendee 12 of interest. The data can be typed, dictated, or selected from a variety of menu options, depending on the nature of the data manipulation means 22. When the data is later transferred to a personal computer 41 of the user 14, the notes are also transferred for later recall and reference.

Unlike most hand-held computers 20, the hand-held computers 20 of this invention are produced for distribution to people who attend conferences or trade shows. The hand-held computers 20 are meant to be taken home with the user 14 for later reference and/or download to the personal computer 41 of the user 14. In its most preferred embodiment, the hand-held computer 20 preferably bears an advertising indicia 26. The advertising space thus provided allows the conference sponsor to collect additional revenues from the conference and finance the acquisition of the hand-held computers 20.

The invention further includes the method for using the above-described hand-held computer 20 to provide mass distributing of specialty data at conferences, conventions, sporting events, and similar large gatherings and events. As described in more detail below, data from a central computer 40 is downloaded into a plurality of the hand-held computers 20 described above via the initial data input means 29. Companies can then prepare advertisements that directly target users 14 likely to be interested in the data. The advertising is preferably sold for an amount greater than the cost of manufacturing the hand-held computers 20. Advertising indicia 26 is then imprinted upon the hand-held computers 20. The advertising may be imprinted directly upon the hand-held computer 20, or upon a sticker that is placed upon the hand-held computer 20. The advertising indicia 26 may be placed anywhere on the hand-held computer 20; and the advertising indicia 26 may also be programmed to appear on the display means 24. The hand-held computers 20 are then distributed to various users 14.

This process gives rise to several unique advantages. The hand-held computers 20 may be distributed at a low cost, thereby resulting in a much wider user 14 base than normal. Such a large user base, coupled with a very tightly targeted market segment, provides a powerful incentive to advertisers to purchase advertisements. In addition, the hand-held computers 20 are designed to be retained rather than thrown away, so the advertising indicia 26 remains effective for some time following distribution. In its preferred embodiment, the initial data input means 29 includes a global computer network that allows the central computer 40 to disseminate recent data to a widely dispersed network of users 14. This new data may include updated advertising indicia 26 to be displayed on the display means 24. The data is stored in the central computer 40, where it can be periodically updated and made available for periodic downloading through the global communications network.

This method can be used in many fields of interest. In one embodiment, the method is adapted to be used at conferences and conventions, as described more thoroughly below. In another embodiment, the method is adapted to be used at sporting events. For example, the statistics of a football team, the statistics about the individual players, and information regarding the team's future schedule can all be made available to all of the fans attending one of the games. Since these statistics change during the course of every game, it is desirable to be able to readily update this data. The described system can be updated after each game, or even during the course of the game. Once the user 14 owns a copy of the hand-held computer 20, he or she is able to download updates via the initial data input means 29, preferably via a transmitter/receiver operably attached to a global computer network, such as the Internet™, as described above. Another embodiment would be useful for future championship sporting events, such as the Olympic(& events. Attendees would have access, through their hand-held computers 20, to data regarding the different teams competing in every event, the history of the various teams, and the star athletes of each team. The data could be easily translated and disseminated to many thousands of attendees, all using the same hand-held computers 20.

Figure 5:
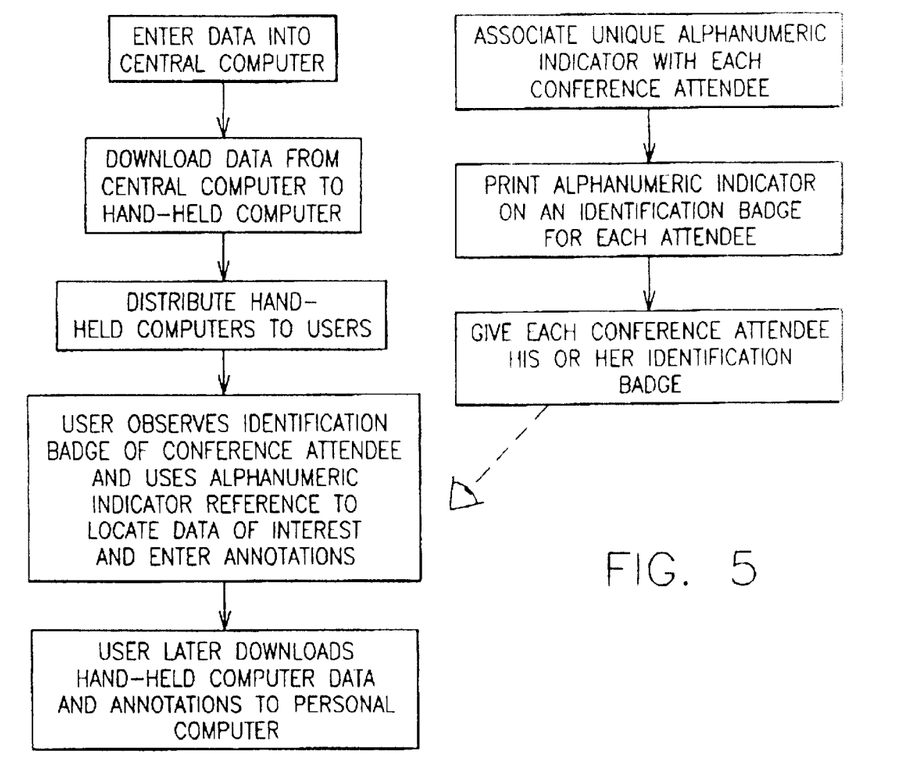
FIG. 5 is a flow chart of the method for using the hand-held computer to retrieve data about conference attendees wearing identification badges, the identification badge of each conference attendee having a unique alphanumeric indicator.

As shown in FIG. 5, the invention includes the method for using the above-described hand-held computers 20 at conferences or conventions to retrieve data about a conference attendee 12. This method first calls for providing a plurality of the hand-held computers 20 described above; and for providing a plurality of the identification badges 30 described above. A central computer 40 with an initial data input means 29 is used for initial data processing. A list of conference attendees 12 is inputted into the central computer 40 and a unique alphanumeric identifier 34 is associated with each of the conference attendees 12. Data about each of the conference attendees 12 is then inputted into the central computer 40. The data preferably includes the, name and title of each of the conference attendees 23, as well as the company name, address, contact information, information about the company's products and services, and other information that may be of interest to the various users 14 of the hand-held computers 20. The alphanumeric identifier 34 associated with a given conference attendee 12 is inputted with the relevant data. Once all of the information has been inputted into the central computer 40, the data is downloaded to each of the hand-held computers 20. The data is inputted through the initial data input means 29 into the memory means 28. Since the data can be downloaded relatively quickly and easily, it is possible to defer this step until the last minute, thereby allowing the hand-held computers 20 to contain data that is up to date, including late registrants to the conference or convention.

Before the conference, or even as part of the on-site registration process, each attendee's identification badge 30 is printed to display the attendee's assigned unique alphanumeric identifier 34 in an oversized print that is easily viewable from a distance. The identification badge 30 may be printed upon directly with a printer, or a card or sticker may be printed and then attached to the identification badge 30 either with an adhesive or a transparent cover. Those skilled in the art may devise countless methods of preparing the identification badge 30 without deviating from the clear scope of this invention. The identification badge 30 preferably further includes the attendee's name, corporate name, and other forms of identification such as area of specialty or area of special interest. The identification badge 30 may be color coded for easier classification. Finally, the identification badge 30 may also contain a bar code or other similar markings to facilitate registration and easy identification. The data compiled within the central computer 40 is inputted into each of the hand-held computers 20. The data is inputted through the initial data input means 29 and into the memory means 28. As described above, the initial data input means 29 may be any of the data transfer devices well known in the art. The transfer may be accomplished with a direct physical connection, or with a transmitted/receiver using radio waves or an infra-red connection. This transfer of data may be done well in advance of the conference, or as part of the check-in process at the door, depending on the need for last minute updates of information. It is possible to allow the users 14 to update the data in their computers as the conference proceeds, if such an update is required. In the preferred embodiment, the initial data input means 29 may also be used to transfer the data from the hand-held computer 20 to the personal computer 41 of the user 14. This allows the user 14 to store the data for future reference, along with any notes or annotations that the user 14 may have added during the course of the conference. Desktop computer software packages may easily be developed to transform the data into a mailing database, with special attention being drawn to entries noted by the user 14 during the conference. The user 14 is thus able, for example, to make a note in the data that he or she should send a marketing package to specific conference attendees 12.

The desktop computer of the user 14 then automatically prepares a letter, brochure or mailing list based on the notations made in the data stored on the hand-held computer 20.

Once the conference begins, each of the identification badges 30 is distributed to each of its associated conference attendee 12, for attachment to the attendee. As described above, the identification badge 30 may be attached to the clothing of the conference attendee 12 with a weak adhesive, or clipped to a part of the attendee's clothing. The hand-held computers 20 and identification badges 30 are distributed to various users 14 as they enter the conference. They may be distributed part of the regular registration materials, or they may be sold for a small fee to interested parties. The hand-held computers 20 allow the user 14 to quickly find data that is relevant to one of the conference attendees 12 by reference to the identification badge 30 being worn by that conference attendee 12. The hand-held computer 20 also provides a simple and easy method of storing and transporting a great deal of data about a conference. The data may be stored for years and always ready for easy reference, either in the memory means 28 of the hand-held computer 20 or as transferred to the personal computer 41 of the user 14.

Figure 6:
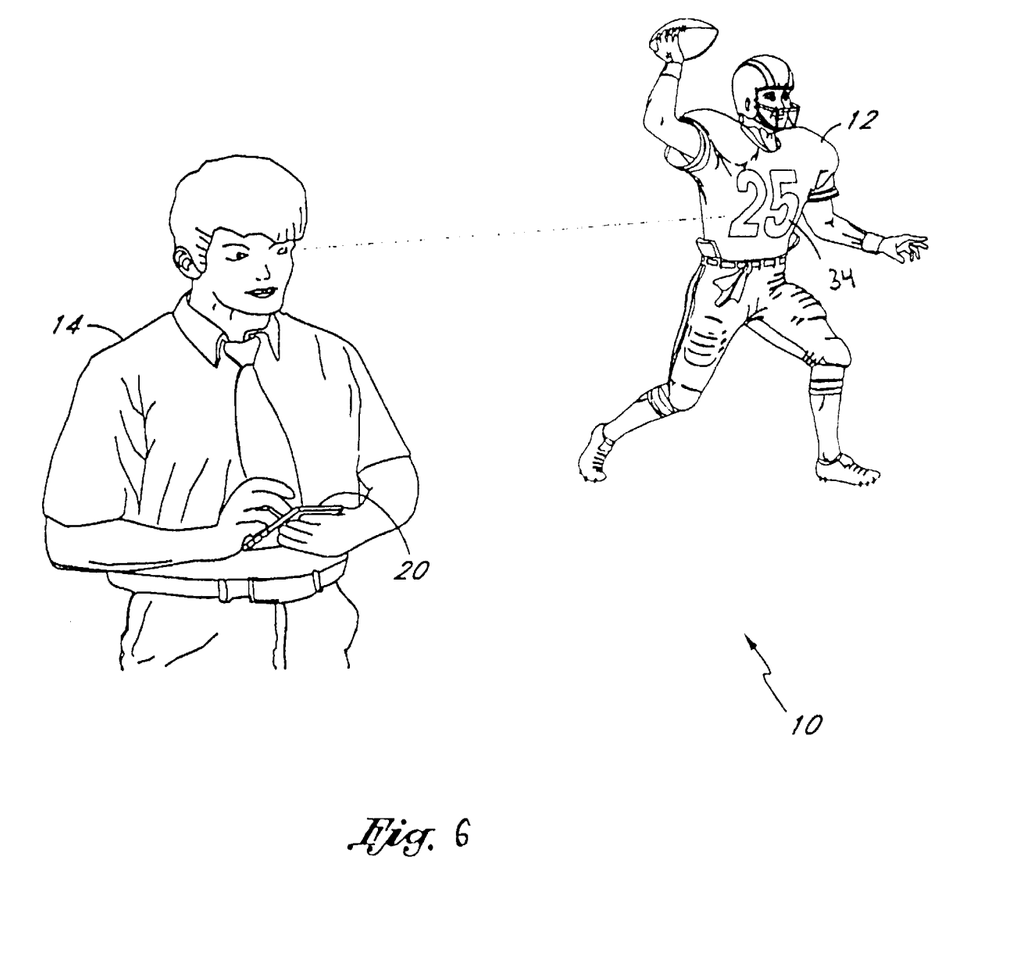
FIG. 6 is a perspective view of the present invention being used by a user to retrieve information about a football player.

Those skilled in the art may devise alternative uses for the above-described hand-held computer 20. In addition to being used in conferences as described above, the hand-held computer 20 may also be used with conventions and similar large networking events. Additional features, such as directories of booth locations, organized by the associated alphanumeric indicators 34, may be devised to customize the hand-held computer 20 to a specific event. Another contemplated use for this technology includes programming the hand-held computer 20 with information regarding specific sports teams and their players. As shown in FIG. 6, the hand-held computers 20 can contain statistics about team players, the statistical data being referenced to the player's name or uniform number. The hand-held computers 20 may also contain additional information of interest about the team, including the team record, the future schedule of games, miscelaneous items of interest to fans, and advertising indicia 26 targeted to sports fans. This data is inputted in the same manner as described above; and the hand-held computers 20 are then distributed to attendees or sold for a small fee. The data in the central computer 40 can be updated as the season progresses or at the end of an event; and the data can be downloaded into the same or a new batch of hand-held computers 20 between games, thereby providing the fans with up to date statistics. In yet another embodiment, the hand-held computers 20 are distributed by hotels to their guests. In this embodiment, the hand-held computers 20 contain data about local restaurants and points of interest; and the advertising indicia 26 include advertisements from the hotel and/or some of the local establishments. The hotel could produce large quantities of the hand-held computers 20 for distribution to their guests, and the guests would benefit from a fast and easy reference that they can take with them as they explore the city.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A method for retrieving data about conference attendees, the method comprising the steps of:
    a) providing a plurality of hand-held computers, each hand-held computer having a microprocessor, a memory means for storing data, an initial data input means for inputting data into the memory means, a display means for displaying the data, a data manipulation means for manipulating the data;
    b) providing a plurality of identification badges, each identification badge having an attachment means for removably attaching the identification badge to one of the conference attendees;
    c) providing a central computer with an initial data input means;
    d) inputting into the central computer a list of conference attendees;
    e) associating a unique alphanumeric identifier with each of the conference attendees;
    f) inputting data into the central computer about each of the conference attendees, the data including a relevant portion for each of the conference attendees;
    g) inputting the unique alphanumeric identifier of each of the conference attendees in association with the relevant portion of the data into the central computer;
    h) printing an identification badge for each conference attendee with the attendee's name;
    i) printing the identification badge of each conference attendee with the unique alphanumeric identifier in oversized print that is larger than the attendee's name and easily viewable from a distance;
    j) downloading the data from the central computer into each of the hand-held computers, the data being downloaded through the initial data input means and into the memory means;
    k) distributing each identification badge to its associated conference attendee, for attachment to each of the conference attendees; and
    l) distributing the hand-held computers with the downloaded data, thereby enabling retrieval of the relevant portion of the data for a conference attendee by reference, at a distance, to the unique alphanumeric identifier printed on the respective attendee's identification badge, wherein the unique alphanumeric identifier is input into a hand-held computer in order to retrieve the relevant portion of the data for that attendee.

2. The method of claim 1 further including the step of imprinting each of the hand-held computers with an advertising indicia.

3. The method of claim 1 wherein the data manipulation means is a keypad electronically connected to the memory means.

4. The method of claim 1 wherein the data manipulation means is a microphone operably connected to a voice recognition program stored in the memory means.

5. The method of claim 1 wherein the initial data input means is at least one electrical contact connector adapted to receive data from the central computer and transmit the data to the memory means.

6. A method for retrieving data about conference attendees, the method comprising the steps of:
    a) providing a plurality of hand-held computers, each hand-held computer having a microprocessor, a memory means for storing data, an initial data input means for inputting data into the memory means, a display means for displaying the data, a data manipulation means for manipulating the data;
    b) providing a plurality of identification badges, each identification badge having an attachment means for removably attaching the identification badge to one of the conference attendees;
    c) providing a central computer with an initial data input means;
    d) inputting into the central computer a list of conference attendees;
    e) associating a unique alphanumeric identifier with each of the conference attendees;
    f) inputting data into the central computer about each of the conference attendees, the data including a relevant portion for each of the conference attendees;
    g) inputting the unique alphanumeric identifier of each of the conference attendees in association with the relevant portion of the data into the central computer;
    h) printing an identification badge for each conference attendee with the attendee's name;
    i) printing the identification badge of each conference attendee with the unique alphanumeric identifier viewable from a distance by an attendee without mechanical assistance;
    j) downloading the data from the central computer into each of the hand-held computers, the data being downloaded through the initial data input means and into the memory means;

k) distributing each identification badge to its associated conference attendee, for attachment to each of the conference attendees; and l) distributing the hand-held computers with the downloaded data, thereby enabling retrieval of the relevant portion of the data for a conference attendee by reference, at a distance, to the unique alphanumeric identifier printed on the respective attendee's identification badge, wherein the unique alphanumeric identifier is input into a hand-held computer in order to retrieve the relevant portion of the data for that attendee.

* * * * *

UNITED STATES PATENT AND TRADEMARK OFFICE
CERTIFICATE OF CORRECTION

PATENT NO. : 6,347,301 B1
DATED : February 12, 2002
INVENTOR(S) : Bearden, III et al.

It is certified that error appears in the above-identified patent and that said Letters Patent is hereby corrected as shown below:

<u>Column 5,</u>
Line 28, please change "Intermet" to -- Internet --.
Line 30, please change "Olympic (&" to -- Olympic ® --.
Line 49, please change "the, name" to -- the name --.

Signed and Sealed this

Third Day of December, 2002

JAMES E. ROGAN
*Director of the United States Patent and Trademark Office*